(12) United States Patent
Adamski et al.

(10) Patent No.: US 10,024,954 B1
(45) Date of Patent: Jul. 17, 2018

(54) INTEGRATED AXIAL CHOKE ROTARY OFFSET PARABOLIC REFLECTOR

(71) Applicant: THE UNITED STATES OF AMERICA AS REPRESENTED BY THE SECRETARY OF THE NAVY, Washington, DC (US)

(72) Inventors: Piotr Roman Adamski, Port Hueneme, CA (US); Ferdinando Anthony Lauriente, Arroyo Grande, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 1305 days.

(21) Appl. No.: 13/987,236

(22) Filed: Nov. 1, 2013

Related U.S. Application Data

(60) Provisional application No. 61/796,797, filed on Nov. 5, 2012.

(51) Int. Cl.
| | | |
|---|---|---|
| *G01S 7/03* | (2006.01) | |
| *H01Q 1/12* | (2006.01) | |
| *H01Q 3/02* | (2006.01) | |
| *H01Q 13/06* | (2006.01) | |
| *G01S 7/02* | (2006.01) | |
| *H01Q 15/14* | (2006.01) | |

(52) U.S. Cl.
CPC .............. *G01S 7/032* (2013.01); *H01Q 1/12* (2013.01); *H01Q 1/125* (2013.01); *H01Q 3/02* (2013.01); *H01Q 13/065* (2013.01); *G01S 2007/027* (2013.01); *H01Q 15/14* (2013.01)

(58) Field of Classification Search
CPC ........ H01Q 1/12; H01Q 1/1207; H01Q 1/125; H01Q 1/1264; H01Q 1/27; H01Q 1/28; H01Q 1/32; H01Q 3/00; H01Q 3/02; H01Q 13/065; H01Q 15/00; H01Q 15/14; H01Q 15/16; G01S 2007/027; G01S 7/03; G01S 7/032; G01S 13/88
See application file for complete search history.

(56) References Cited

U.S. PATENT DOCUMENTS

| | | | | |
|---|---|---|---|---|
| 4,408,209 A * | 10/1983 | Urien | ................... | H01Q 19/195 343/705 |
| 4,504,836 A * | 3/1985 | Seavey | ................ | H01Q 21/245 333/21 A |
| 4,668,955 A * | 5/1987 | Smoll | .................. | H01Q 19/191 343/761 |
| 5,281,975 A * | 1/1994 | Hugo | ..................... | H01Q 1/125 248/183.2 |
| 5,619,215 A * | 4/1997 | Sydor | ...................... | H01Q 3/08 343/765 |
| 5,724,042 A * | 3/1998 | Komatsu | ................. | G01S 7/032 342/175 |
| 6,111,542 A * | 8/2000 | Day | ....................... | H01Q 21/06 342/359 |
| 7,345,617 B2 * | 3/2008 | Friborg | ................... | G01S 13/88 342/175 |
| 7,443,355 B2 * | 10/2008 | Griffiths | ................. | H01Q 19/19 343/781 CA |

(Continued)

*Primary Examiner* — Peter M Bythrow
(74) *Attorney, Agent, or Firm* — Christopher L. Blackburn

(57) ABSTRACT

Antenna systems and methods employing an axial metallic corrugated choke ring attached to an offset reflector assembly and circumscribing (without contacting) a stationary metallic conical feed horn.

8 Claims, 9 Drawing Sheets

(56) References Cited

U.S. PATENT DOCUMENTS

| | | | | |
|---|---|---|---|---|
| 8,018,374 | B2* | 9/2011 | Imai | G01S 7/03 |
| | | | | 342/135 |
| 9,281,561 | B2* | 3/2016 | Monte | H01Q 3/18 |
| 2004/0113861 | A1* | 6/2004 | Jackson | H01P 1/066 |
| | | | | 343/882 |
| 2008/0042921 | A1* | 2/2008 | Gierow | H01Q 1/082 |
| | | | | 343/882 |
| 2008/0309569 | A1* | 12/2008 | Berejik | H01Q 1/185 |
| | | | | 343/761 |
| 2009/0135051 | A1* | 5/2009 | Bishop | G01S 13/89 |
| | | | | 342/175 |
| 2009/0224993 | A1* | 9/2009 | Peichl | G01S 13/426 |
| | | | | 343/761 |
| 2012/0013515 | A1* | 1/2012 | Berejik | H01Q 1/125 |
| | | | | 343/766 |
| 2014/0085129 | A1* | 3/2014 | Westerling | H01Q 9/28 |
| | | | | 342/124 |

\* cited by examiner

INTEGRATED AXIAL CHOKE ROTARY OFFSET PARABOLIC REFLECTOR

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Antenna systems and methods employing an offset reflector assembly.

It is to be understood that the foregoing and the following description are exemplary and explanatory only and are not to be viewed as being restrictive of the invention, as claimed.

DESCRIPTION OF EMBODIMENTS OF THE INVENTION

Like reference numbers represent like parts. Embodiments of the invention include an offset reflector assembly formed of a reflector plate, an axial metallic corrugated choke ring, a circular choke ring mounting bracket, a circular servo ring mounting bracket, and support arms connecting the reflector plate to the circular servo ring mounting bracket. The antenna system geometry employs circular symmetry around a centrally located aperture partially occupied by a metallic conical feed horn circumscribed by the servo driven circular choke ring mounting bracket, circular choke ring mounting bracket, and axial metallic corrugated choke ring, wherein the metallic conical feed horn does not make contact with the offset reflector assembly during operation of the antenna system.

Figure 5:
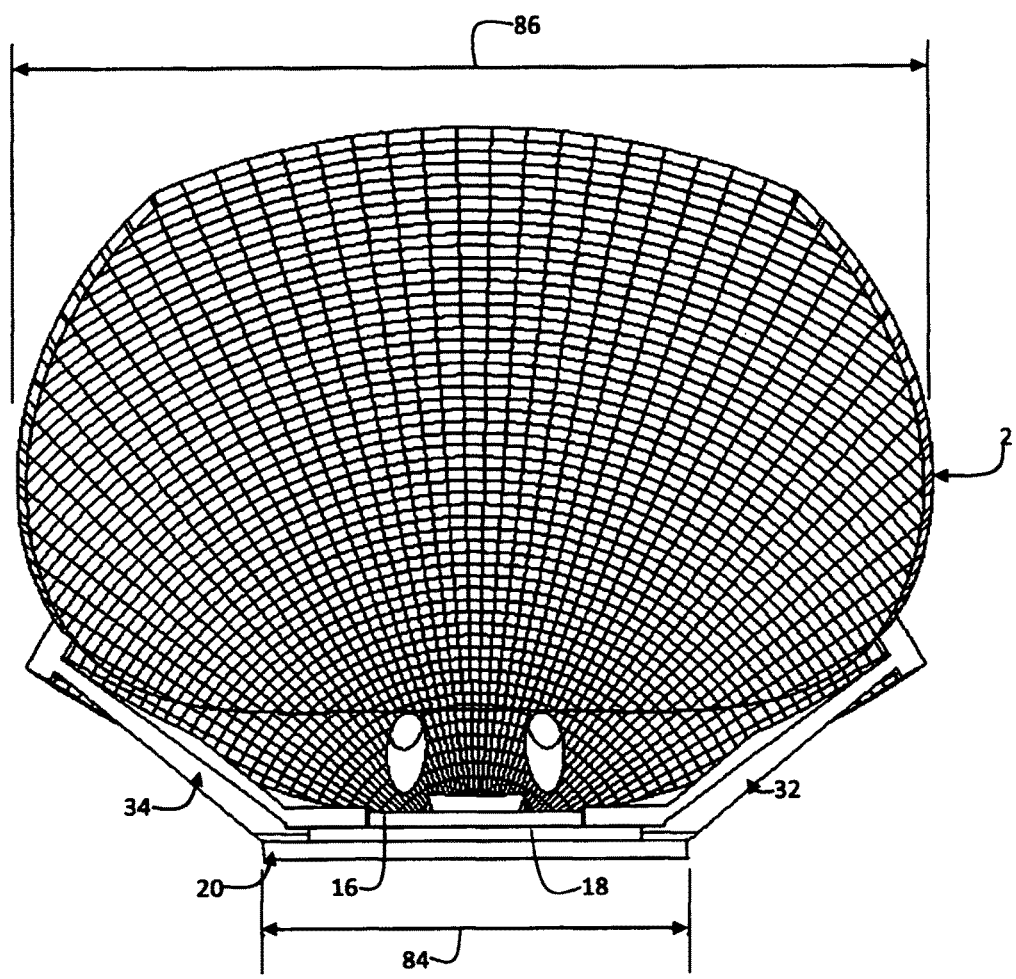
FIG. 5 is a front view of an embodiment of the invention sans an axial metallic corrugated choke ring and metallic conical feed horn. Note that grid lines on front face of the reflector plate do not represent physical structure; the grid lines are included merely to illustrate reflector plate curvature.

With reference to FIGS. 1-6, asymmetric (parabolic) offset reflector plate ("reflector plate") 2 is formed of a metallic surface layer deposited on a non-metallic support structure material. With reference to FIGS. 1-4, the portion of the reflector plate within the broken/dashed line 3 constitutes a metallic surface deposited on a non-metallic material; the portion outside the broken/dashed line 3 is formed of non-metallic material without an overlaid metallic surface. The deposited metalized surface thickness should be greater than about 10 times the skin depth of the operating frequency. In some embodiments, the metallic surface is deposited using a process known as sputter deposition (also known as physical vapor deposition (PVD)). With reference to FIG. 5, reflector plate 2 has a width (represented using arrow 86) of about 11.8 inches. The inner curvature of reflector plate 2 surface is described by the following parametric equation, in terms of varying parameter t, where t=0 (at the reflector base) to 1 (at the reflector tip):

$$x(t)=(2+t*7.87)^2/12-3 \text{ [in]}$$

$$y(t)=2+t*7.87 \text{ [in]}$$

Figure 6:
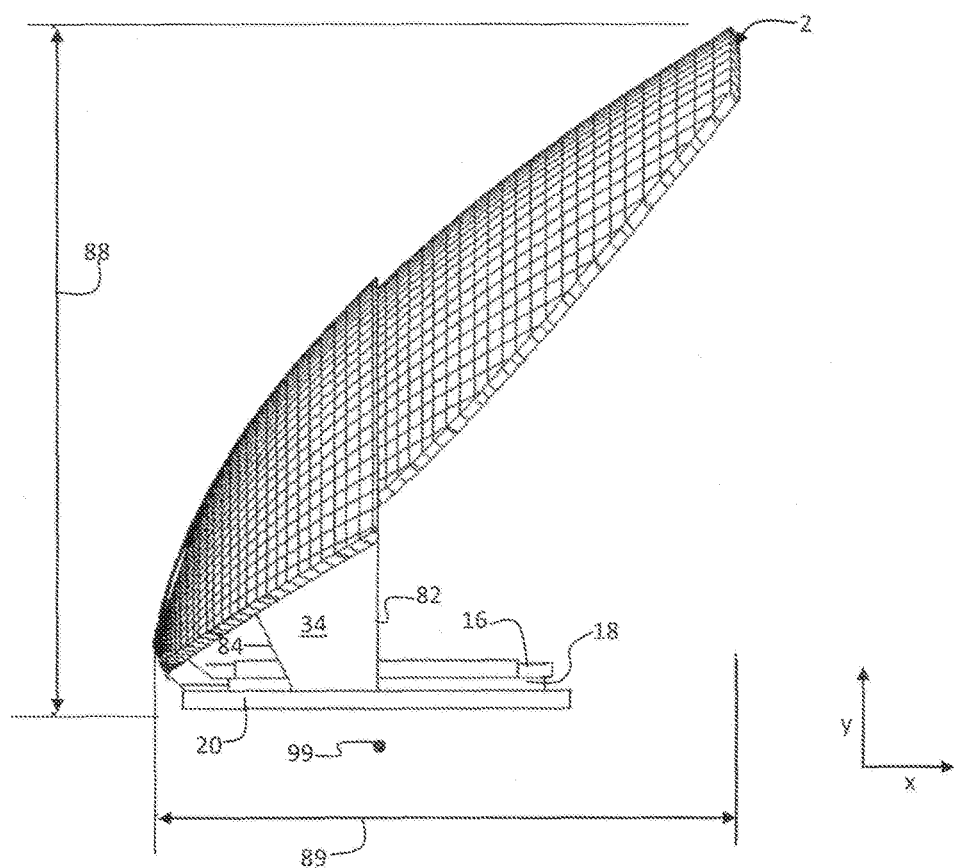
FIG. 6 is a side view of an embodiment of the invention sans an axial metallic corrugated choke ring and metallic conical feed horn. Note that grid lines on front face of the reflector plate do not represent physical structure; the grid lines are included merely to illustrate reflector plate curvature.

With reference to FIG. 6, the reflector plate surface geometry can be derived by rotating the curvature signature defined by the parametric equation about the x-axis running through feed horn phase center reference point 99 (located 0.25 inches below the bottom surface of circular servo ring mounting bracket 20).

Figure 8:
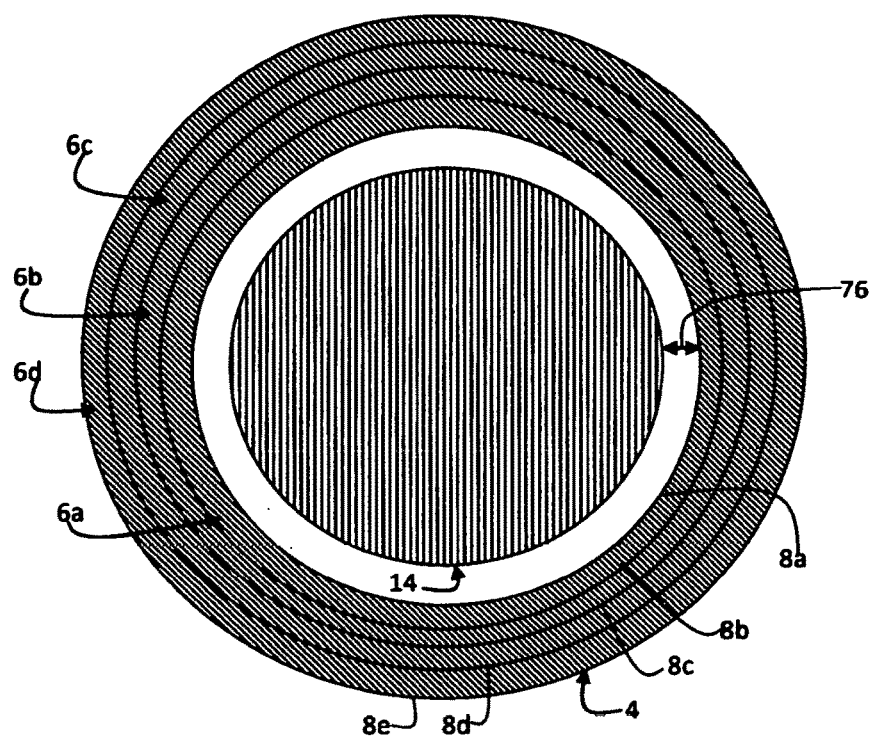
FIG. 8 is a top view of an embodiment of a metallic conical feed horn centrally inserted through an embodiment of an axial metallic corrugated choke ring.
Figure 9:
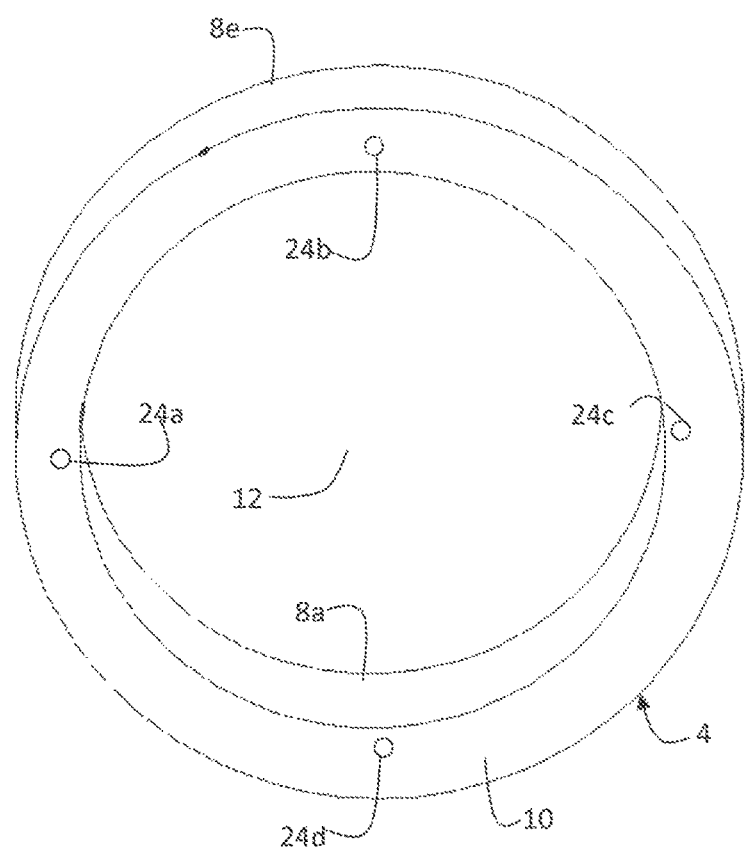
FIG. 9 is a bottom perspective view of an embodiment of an axial metallic corrugated choke ring.

With reference to FIGS. 2-4 and 8, offset reflector assembly embodiments further include an axial metallic corrugated choke ring 4. In some embodiments, axial metallic corrugated choke ring 4 is formed of aluminum. With reference to FIG. 8, axial metallic corrugated choke ring 4 has a plurality of concentric grooves 6a, 6b, 6c, 6d. Each concentric groove is formed between a pair of equal height and thickness concentric corrugation ridges 6a, 6b, 6c, 6d, 6e. With reference to FIG. 9, concentric ridges extend from cylindrical base segment 10. Axial metallic corrugated choke ring 4 has a central circular aperture 12. A number of concentric corrugation ridges in the axial metallic corrugated choke ring is approximately 3 to 6 per wavelength. In some embodiments, axial metallic corrugated choke ring 4 has an inner diameter of about 3.5 inches and an exterior diameter of about 5 inches. In some embodiments, the number of corrugation ridges is five and the number of grooves is four. The number of concentric grooves/ridges can be determined experimentally by running a number of computer simulations and comparing the resultant evanescent field coupling intensities in each groove partition. It was determined that five concentric corrugation ridges and four concentric grooves provided sufficient surface wave propagation attenuation with its expected overall sidelobe suppression together with apparent antenna system gain performance improvement. Pitch (P) is approximately 0.2 to 0.3 wavelength. Each corrugation ridge has the same thickness (t) as the other corrugation ridges, where "t" is approximately 0.1×Pitch. In some embodiments, the gap (G) between adjacent corrugation ridges is uniform for all adjacent corrugation ridges, where G=P-t, P=pitch, and t=corrugation ridge thickness. However, in other embodiments, the ridge thickness and pitch varies. With reference to FIG. 8, axial metallic corrugated choke ring 4 acts in a manner to prevent a surface wave from propagating radially outward from the metallic conical feed horn 14. In the absence of the rings, RF energy propagating in the metallic conical feed horn 14 toward the aperture interface with free-space discontinuity causes surface currents to flow on the outer surfaces of the metallic conical feed horn 14. It is these currents that give rise to undesirably high level sidelobes and a high level back-lobe. The corrugated rings serve to suppress the currents on the outside wall of the metallic conical feed horn 14 when the corrugation groove depth is selected as a function of the free-space wavelength at the design frequency $F_{low}$. Specifically, the depth of corrugation grooves 6a, 6b, 6c, 6d (or correspondingly the height of concentric corrugation ridges 8a, 8b, 8c, 8d, 8e) is selected to be λ/4 in accordance with the lowest frequency of interest (lowest operating frequency of the offset reflector assembly with the horn centrally inserted) ($F_{low}$), $\lambda = c/F_{low}$, where c is the speed of light. The proposed embodiment reduces any back-lobe radiation while also achieving reduction in far-out sidelobe levels, as to optimize the integrated reflector EIRP performance over an octave bandwidth starting at $F_{low}$ and terminating at $F_{high} = 2*F_{low}$. With reference to FIG. 9, cylindrical base segment of axial metallic corrugated choke ring 4 includes four threaded screw holes 24a, 24b, 24c, and 24d.

Figure 1:
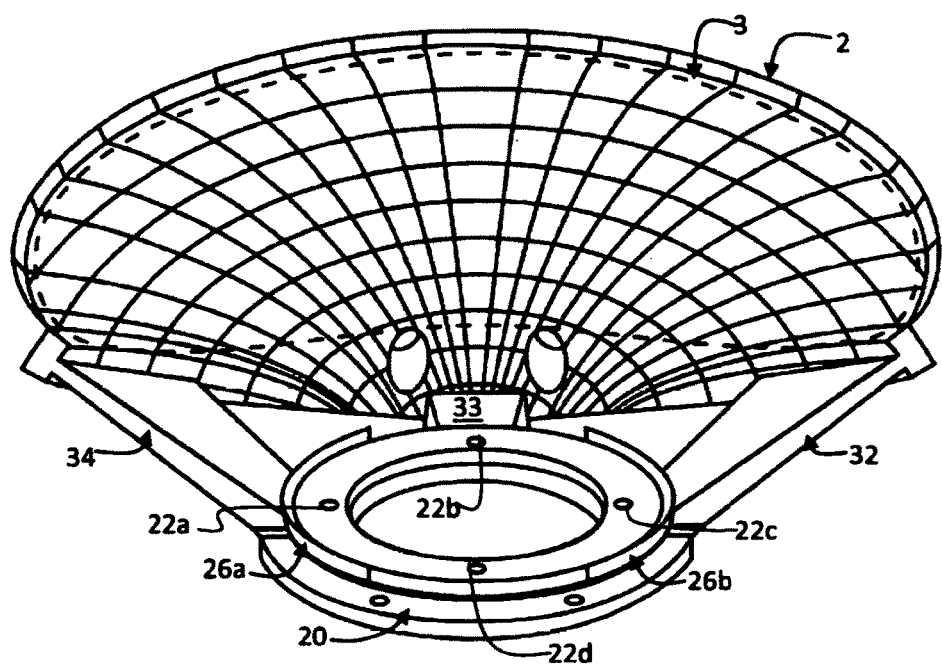
FIG. 1 is a front perspective view of an embodiment of the invention sans an axial metallic corrugated choke ring and metallic conical feed horn. Note that grid lines on front face of the reflector plate do not represent physical structure; the grid lines are included merely to illustrate reflector plate curvature.
Figure 7:
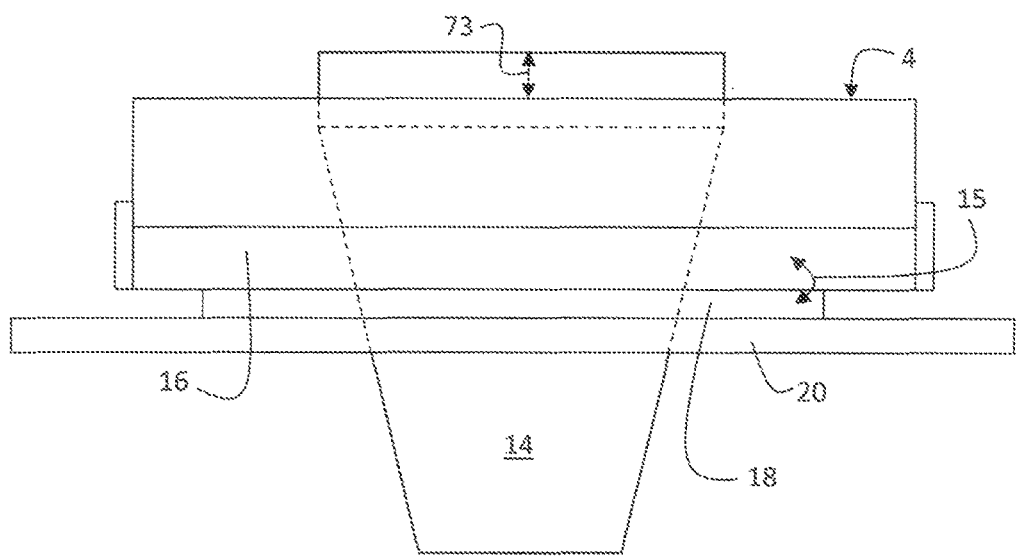
FIG. 7 is a front view of an embodiment of an offset reflector assembly sans a reflector plate and support arms.

With reference to FIG. 7, offset reflector assembly embodiments further include a circular choke ring mounting bracket 15 disposed on circular servo ring mounting bracket 20. Circular servo ring mounting bracket 20 is adapted to interface with a servo assembly. In some embodiments, circular servo ring mounting bracket 20 has an inner diameter of about 3 and ⅞ inches and an outer diameter of about 5.5 inches and a height/thickness of 0.25 inches. However, dimensions of the circular servo ring 20 are driven by the servo motor (a work-piece) to which the antenna assembly will be connected. With reference to FIG. 7, circular choke ring mounting bracket 15 can be thought of as being formed of two stacked integrally formed ring portions—a lower ring portion 18 and an upper ring portion 16. Lower ring portion 18 is disposed on circular servo ring mounting bracket 20 and has an inner diameter about equal to the inner diameter of the circular choke ring mounting bracket 20; in some embodiments, lower ring portion 18 has a thickness/height of about 3/16 inches. Upper ring portion 16 extends up from lower ring portion 18 and has an inner diameter less than the inner diameter of lower ring portion 18; in some embodiments, inner diameter of upper ring portion 16 is about 3.25 inches and height/thickness of upper ring portion 16 is about 3/16 inches. With reference to FIG. 1, upper ring portion 16 includes four equidistantly spaced screw apertures, each passing through the entirety of the height/thickness of upper ring portion 16. The inner radius of upper ring portion 16 is no greater than inner radius of lower ring portion minus diameter of apertures 22a, 22b, 22c, and 22d. Peripheral curved collars 26a and 26b are used for precision center axis axial metallic corrugated choke ring alignment and extend upward from upper ring portion 16. The alignment collars ensure the proper minimum distance between the stationary antenna aperture edge and the plurality of circular rings. Apertures 22a, 22b, 22c, and 22d (in FIG. 1) are intended to align with screw holes 24a, 24b, 24c, and 24d (in FIG. 9) when axial metallic corrugated choke ring 4 is placed on circular choke ring mounting bracket 15. Circular servo ring mounting bracket 20 and circular choke ring mounting bracket 15 should be formed of electrically non-conductive material (such as dielectric materials including for example plastic and fiberglass) to reduce overall assembly weight and eliminate unwanted electrical interaction between the ring and the metalized reflector surface.

With reference to FIGS. 1-5, offset reflector assembly embodiments further include support arms 32, 33, 34 connecting reflector plate 2 to circular servo ring mounting bracket 20. The support arms 32, 33, 34 should be mechanically sufficient to support the reflector plate 2 and formed of electrically non-conductive material (such as dielectric materials including for example plastic and fiberglass). In some embodiments, support arms 32 and 34 are tapered flat arms that taper out (width-wise) as distance from circular servo ring mounting bracket 20 increases. Support arms 32, 33, and 34 are attached to reflector plate 2 at non-electrically conductive portions of reflector plate 2. With reference to FIG. 6, outer side area 82 of support arms has a length of about 3.5 inches while the inner side area 84 of support arms has a length of about 1.7 inches.

Figure 2:
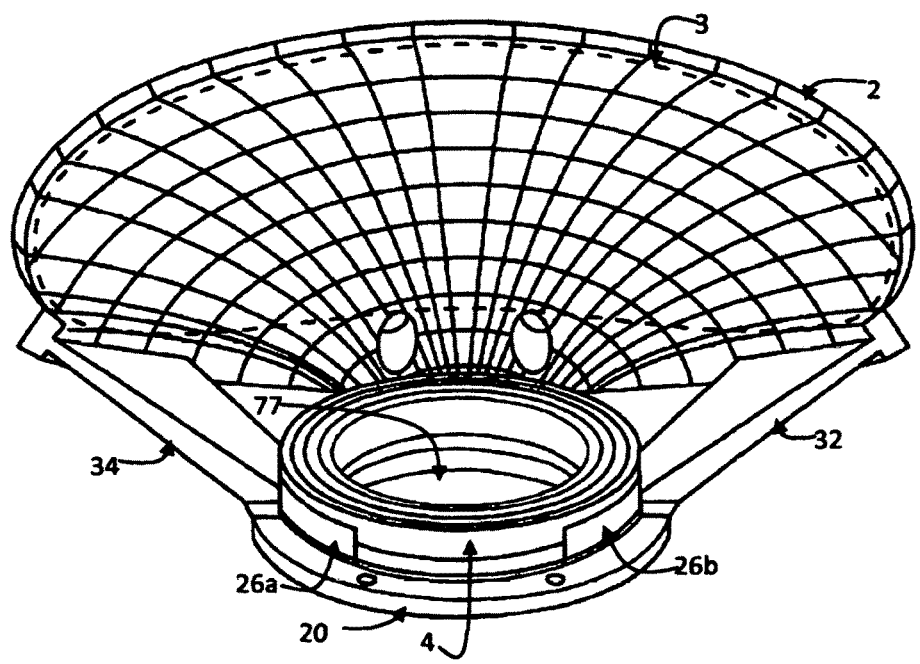
FIG. 2 is a front perspective view of an embodiment of the invention sans a metallic conical feed horn. Note that grid lines on front face of the reflector plate do not represent physical structure; the grid lines are included merely to illustrate reflector plate curvature.
Figure 3:
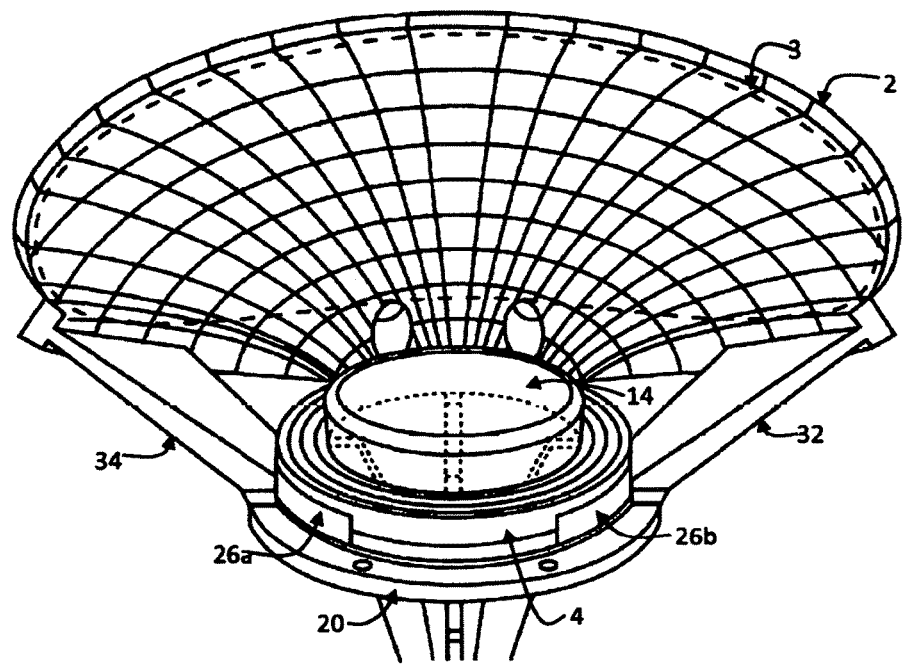
FIG. 3 is a front perspective view of an embodiment of the invention with an embodiment of a metallic conical feed horn centrally inserted in an embodiment of an offset reflector assembly. Note that grid lines on front face of the reflector plate do not represent physical structure; the grid lines are included merely to illustrate reflector plate curvature.
Figure 4:
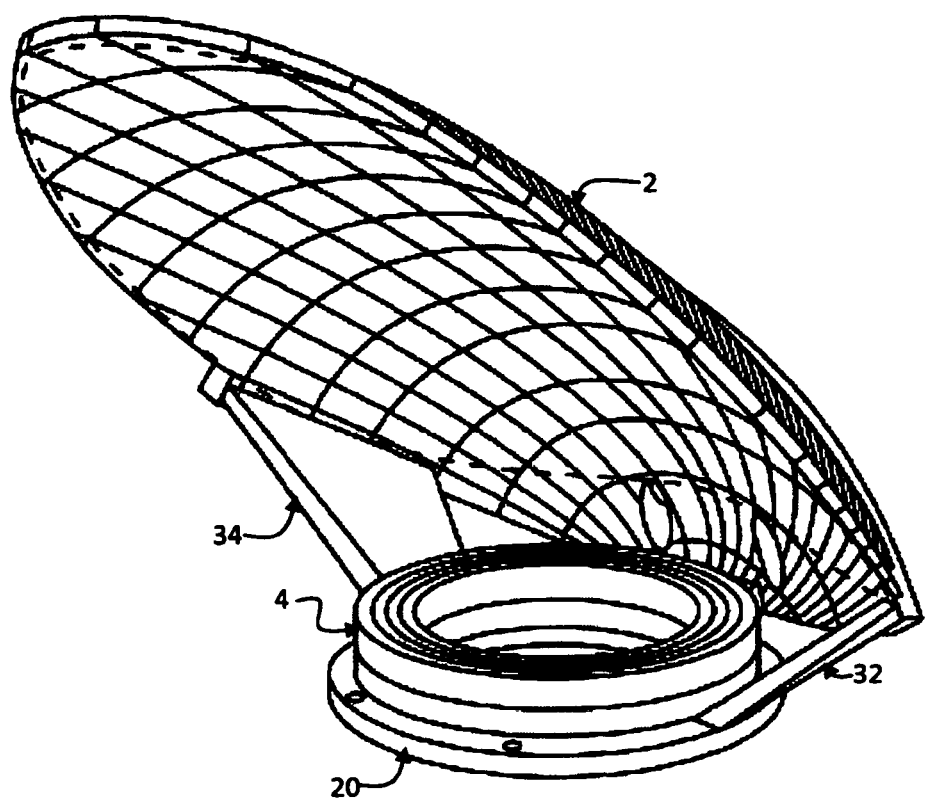
FIG. 4 is a side perspective view of an embodiment of the invention sans a metallic conical feed horn. Note that grid lines on front face of the reflector plate do not represent physical structure; the grid lines are included merely to illustrate reflector plate curvature.

With reference to FIGS. 2, 3, and 7, embodiments employ a metallic conical feed horn 14 centrally inserted in the orifice 77 created by axial metallic corrugated ring 4, servo ring mounting bracket 20, and circular choke ring mounting bracket 15. In some embodiments, the metallic conical feed horn 14 is a smooth wall quad-ridged feed horn; however, any known metallic conical feed horn can be employed so long as the metallic conical feed horn has a radiating aperture shape that is circular. With reference to FIG. 8, the distance between outer metallic conical feed horn edge 14 and innermost concentric corrugation ridge 8a represented by arrow 76 is approximately the same width as the corrugated rings spacing that is subsequently refined in computer model simulations and verified by experimental data. With reference to FIG. 7, the distance between the horn aperture edge and the upper edge of axial metallic corrugated choke ring 4 is determined using computer model simulations and verified experimentally.

With reference to FIG. 3, during operation, the metallic conical feed horn 14 is stationary and the offset reflector assembly rotates around the metallic conical feed horn 14 phase center to provide arbitrary field of view coverage. A section of the reflector plate 2 is illuminated with RF energy via the metallic conical feed horn 14.

In the illustrated embodiments the dimensions of the axial choke grooves are optimized for an octave bandwidth starting at a specific frequency of operation with its inherent bandwidth beyond these limits; variations can be made to accommodate a wider operational bandwidth by employing gradually changing corrugation depths in radially outward direction accommodating frequency range variations from $F_{high}$ to $F_{low}$.

In some embodiments of the axial metallic corrugated choke ring can also accommodate moisture retardant dielectric fill material akin to choke grooves filled with foam and sealed by a thin («λ) skin-like plastic end-cap structure. Provided the selected foam relative permittivity constant is close to free space (ε≈1), the choke groove and ring dimensions would remain unaltered as there is no need to compensate for substantial electrical depth/length changes.

Method embodiments include radiating from the metallic conical feed horn when it is partially disposed through the orifice formed by the apertures of the circular servo ring mounting bracket, circular choke ring mounting bracket, and axial metallic corrugated choke ring such that the axial metallic corrugated choke ring circumscribes the metallic conical feed horn at the appropriate position (as described above) without contacting the metallic conical feed horn. The offset reflector assembly is then rotated (using any known servo motor connected to the circular servo ring mounting bracket) about the phase center of the metallic conical feed horn while the metallic conical feed horn is maintained stationary. The surface waves are suppressed via the formation of overmoded coaxial waveguides (with the dominant mode being the TEM mode) using the axial metallic corrugated choke ring. When the height of the rings is 0.25 wavelength they act as RF chokes and effectively suppress radiation along the surface formed by the openings of the rings. However, effective surface wave suppression occurs over the frequency range corresponding to 0.25 wavelength at a design frequency $F_{low}$ up to 0.5 wavelength at an upper frequency $F_{high}$ thusly suppressing backlobe radiation as well as far-out sidelobe radiation.

While the invention has been described, disclosed, illustrated and shown in various terms of certain embodiments or modifications, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A rotary reflector antenna system, comprising:
   a reflector plate;
   an axial metallic corrugated choke ring having a plurality of concentric grooves formed on a cylindrical segment, with each concentric groove being formed between a pair of equal height and thickness corrugation ridges extending from said cylindrical segment, wherein said axial metallic corrugated choke ring has a first circular aperture;
   a pair of support arms formed of non-metallic material;
   a circular servo ring mounting bracket formed of non-metallic material defining a second circular aperture; wherein said circular servo ring mounting bracket is attached to said reflector plate via said pair of support arms;
   a circular choke ring mounting bracket formed of non-metallic material and defining a third circular aperture; wherein said circular choke ring mounting bracket is disposed on top of said circular servo ring mounting bracket; wherein said axial metallic corrugated choke ring is disposed on top of said circular choke ring mounting bracket such that said first circular aperture, said second circular aperture, and said third circular aperture centrally align vertically; wherein said first circular aperture, said second circular aperture, and said third circular aperture form an orifice;
   a stationary metallic conical feed horn disposed through said orifice such that said metallic conical feed horn is axially circumscribed by said axial metallic corrugated choke ring; and
   wherein said metallic conical feed horn is not physically connected to said axial metallic corrugated choke ring;
   wherein a number of said corrugation ridges is 3 to 6 per wavelength at $F_{low}$;
   wherein a width of said corrugation ridges is within a range of 0.1*pitch to 0.2*pitch.

2. The rotary reflector antenna system of claim 1, wherein said number of said corrugation ridges is 5.

3. The rotary reflector antenna system of claim 2, wherein said width of said corrugation ridges is less than $\lambda/10$, where $\lambda=c/F_{low}$, where c=speed of light.

4. The rotary reflector antenna system of claim 3, wherein said circular servo ring mounting bracket has an inner diameter of about 3.785 inches, an outer diameter of about 5.5 inches, and a height/thickness of about 0.25 inches.

5. An antenna horn rotary reflector surface wave suppression method, comprising:
   radiating from a metallic conical feed horn partially disposed through an orifice of an offset reflector assembly formed of a circular servo ring mounting bracket defining a first circular aperture, a circular choke ring mounting bracket stacked on top of said circular servo ring mounting bracket and defining a second circular aperture, an axial metallic corrugated choke ring disposed on top of said circular choke ring mounting bracket, at least two support arms connecting said circular servo ring mounting bracket to a reflector plate; wherein said at least two support arms, said circular choke ring mounting bracket, and said servo ring mounting bracket are formed of non-metallic material; wherein said axial metallic corrugated choke ring is formed of metallic material; wherein said reflector plate is formed of metallic material deposited on a front face of said reflector plate; wherein said first circular aperture is centered vertically in line with said second circular aperture and said first and second circular apertures form said orifice; wherein said metallic conical feed horn is not physically connected to said offset reflector assembly; wherein said axial metallic corrugated choke ring has a plurality of concentric grooves formed on a cylindrical segment, with each concentric groove being formed between a pair of equal height and thickness concentric corrugation ridges extending from said cylindrical segment;
   rotating said offset reflector assembly about a phase center of said metallic conical feed horn while not moving said metallic conical feed horn; and
   suppressing surface waves by forming overmoded coaxial waveguides using said axial metallic corrugated choke ring.

6. The method of claim 5, wherein said number of said corrugation ridges is 5.

7. The method of claim 6, wherein said width of said corrugation ridges is less than $\lambda/10$, where $\lambda=c/F_{low}$, where c=speed of light.

8. The method of claim 7, wherein said circular servo ring mounting bracket has an inner diameter of about 3.785 inches, an outer diameter of about 5.5 inches, and a height/thickness of about 0.25 inches.

* * * * *